United States Patent [19]

Kuo

[11] Patent Number: 5,505,105
[45] Date of Patent: Apr. 9, 1996

[54] CONNECTOR FOR ENGAGING BRAKE CABLES

[76] Inventor: Yung-pin Kuo, No. 55, Alley 121, Lane 175, Kuosheng Rd., Changhua City, Taiwan

[21] Appl. No.: 390,663

[22] Filed: Feb. 17, 1995

[51] Int. Cl.$^6$ .............. F16C 1/10; B62L 1/06; B62L 3/00
[52] U.S. Cl. .............. 74/502.4; 74/502.6; 74/501.5 R; 188/24.19; 188/24.21; 188/2 D; 403/303
[58] Field of Search ............... 74/502.4, 502.6, 74/501.5 R, 502.2; 188/24.19–24.22, 2 D, 196 M, 196 V; 403/303; 192/111 A

[56] References Cited

U.S. PATENT DOCUMENTS

| | | | |
|---|---|---|---|
| 2,160,181 | 5/1939 | Taylor | 188/24.21 X |
| 3,383,941 | 5/1968 | Nielsen et al. | 74/502.4 |
| 3,861,714 | 1/1975 | Evans et al. | 188/24.21 |
| 4,026,390 | 5/1977 | Yoshigai | 188/24.21 |
| 4,552,251 | 11/1985 | Schoch | 188/24.21 |
| 4,850,456 | 7/1989 | Chi | 188/24.19 |
| 4,877,112 | 10/1989 | Malinowski | 74/502.2 |
| 5,060,534 | 10/1991 | Yoshigai | 74/502.4 |
| 5,293,965 | 3/1994 | Nagano | 188/2 D |
| 5,368,136 | 11/1994 | Walte | 188/24.22 |
| 5,431,256 | 7/1995 | Wen | 403/303 X |

FOREIGN PATENT DOCUMENTS

| | | | |
|---|---|---|---|
| 651978 | 10/1937 | Germany | 188/24.21 |
| 442567 | 2/1936 | United Kingdom | 188/24.21 |

*Primary Examiner*—Vinh T. Luong
*Attorney, Agent, or Firm*—Kirkpatrick & Lockhart

[57] ABSTRACT

A connector for engaging brake cables of a bicycle, the connector is composed of a first part and a second part, the first part has a first hole, a second hole and a bore defined therein, two passages defined in the first part and each of which located above the first hole and the second hole respectively, a tubular portion extending from the first part and defining a counter-bore therein in communication with the bore, the second part has a first recess, a second recess and a third hole defined therein, two protrusions extending therefrom and a groove defined therein between the first recess and the second recess and communicating with the third hole, the first part and the second part engaged together by extending the two protrusions through the two passages and a first cable and a second cable respectively received in the first recess, the first hole and the second recess, the second hole, a bolt having a hole defined therein for a third brake cable extending therethrough and the bolt threadedly engaged to a nut to securely engage the third brake cable in the connector.

5 Claims, 6 Drawing Sheets

CONNECTOR FOR ENGAGING BRAKE CABLES

BACKGROUND OF THE INVENTION

The present invention relates to a connector and more particularly, to a connector engaging brake cables of a bicycle.

Referring to FIGS. 1, 2 and 3, a bicycle has two brake arms 80 (only one is shown) each pivotally engaged to a corresponding front fork 90 and positioned between one of two sides of a wheel rim 92 of the bicycle. One of the brake arms 80 is connected to a first brake cable 651 as shown in FIG. 2 and the other brake arm is connected with a second brake cable 652, both the first and the second brake cables 651, 652 extend upwardly to connect to a connector 70 which is composed of a cover 74 and a base 75. The cover 74 has a first hole 72 and a second hole 73 defined therein and, a cut-out 71 is defined in a periphery of the cover 74 above and between the first and the second holes 72, 73, the base 75 has a recess 76 defined in a side thereof corresponding to the first hole 72 of the cover 74, a protrusion 77 extending from the side of the base 75 and corresponding to the second hole 73, and a first groove 78 defined transversely in the side between the protrusion 77 and the recess 76, a second groove 79 defined in the side and communicating with the first groove 78 and a cut-out 761 defined in a periphery thereof and communicating with the recess 76. When assembling the connector 70, the first brake cable 651 is received in the first groove 78 and extends to a brake lever 93 (see FIG. 3), the second brake cable 652 has a first end with a head 6521 formed thereto which is received in the recess 76 and the head 6521 extends through the first hole 72 of the cover 74 which is engaged to the base 75 by extending the protrusion 77 through the second hole 73 of the cover 74 and then deforming the protrusion 77 extending out of the second hole 73 to fixedly engage the cover 74 and the base 75, wherein a second end of the second brake cable 652 is pivotally engaged to the brake arm which is not shown in figures. The second brake cable 652 extends out from the connector 70 via the cut-out 761 and the first brake cable 651 is removed from the first groove 78 to the second groove 79 and connected to the brake arm 80 when the brake arm 80 connected thereto is set.

When a rider grasps the brake lever 93, the connector 70 is pulled upwardly by the first brake cable 651 and the two brake arms 80 are pivoted to stop the wheel rim 92 by a brake block 82 connected to each of the brake arms 80 contacting the wheel rim 92. However, under such an arrangement, the brake arm 80 connected to the first brake cable 651 tends to bear a larger force from the first brake cable 651 which is directly connected to the brake lever 93 than that of the brake arm connected to the second brake cable 652 such that a position of the brake arm 80 connected to the first brake arm 651 needs to be often adjusted by a technician in order to maintain its suitable position corresponding the brake arm connected to the second brake cable 652.

The present invention intends to provide a connector composed of a first part and a second part, the connector has a first brake cable and a second brake cable extending therefrom and a third brake cable securely engaged thereto by a bolt and a spring, the third brake cable connected to a brake lever such that when the brake lever is grasped it will provide an equally distributed force to the first and the second brake cables to mitigate and/or obviate the above-mentioned problems.

SUMMARY OF THE INVENTION

The present invention provides a connector for engaging brake cables of a bicycle, the connector has a bore defined therein through which a bolt extends and a groove transversely defined therein which is in communication with and perpendicular to the bore. A first brake cable and a second brake cable respectively extend from the connector and connect to a corresponding brake arm thereof, a third brake cable extending to connect a brake lever at one end thereof and passing through a hole defined in the bolt and extending through the groove with the other end thereof, the bolt engaged to a nut via a spring and a washer.

It is an object of the present invention to provide a connector composed of a first part and a second part and having two brake cables engaged thereto, the two brake cables respectively connected to a corresponding brake arm thereto and a third brake cable securely however adjustably engaged to the connector so as to provide an equal force to the two brake cables when the third brake cable is pulled up.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
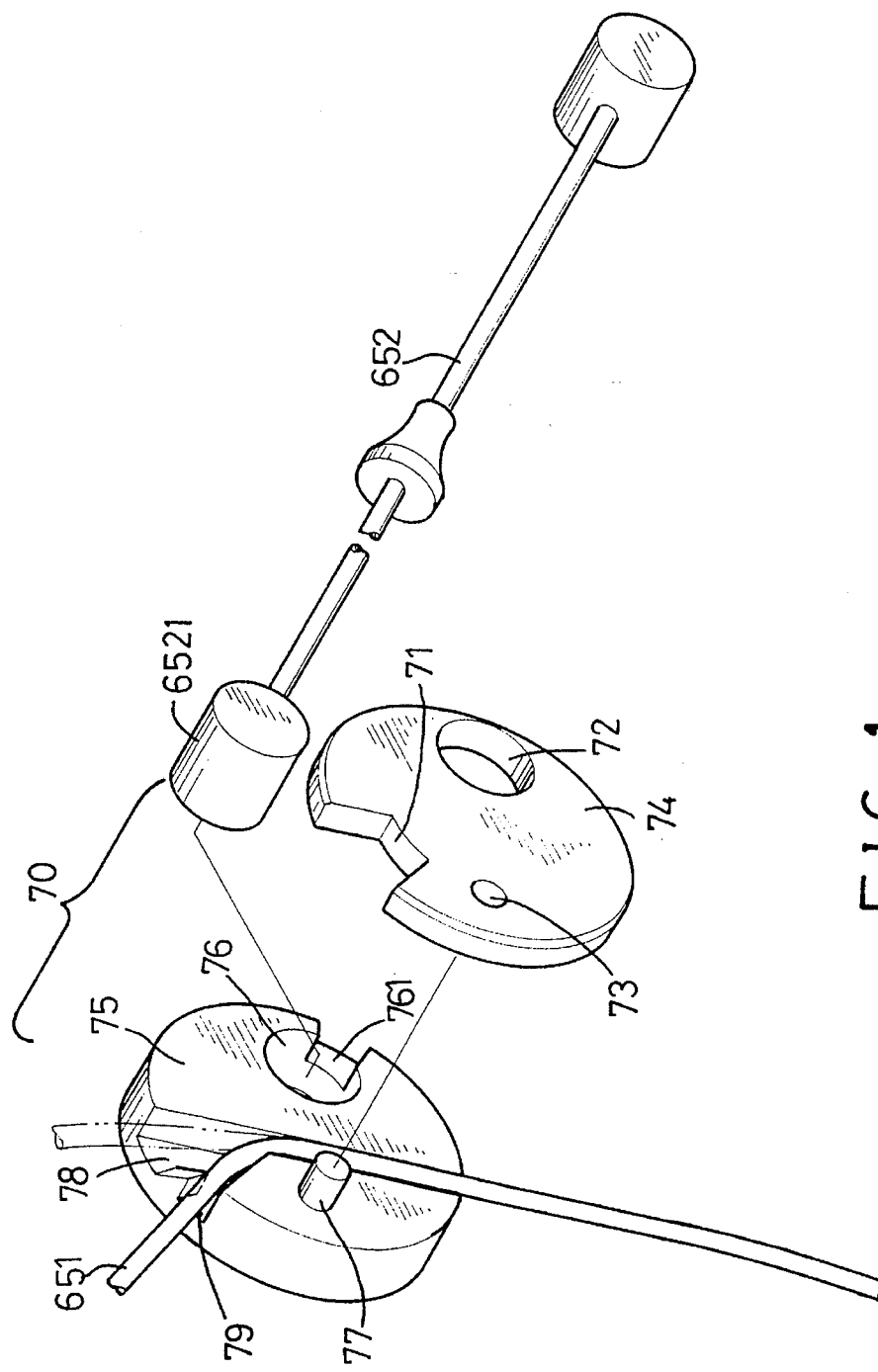
FIG. 1 is an exploded view of a conventional connector and two brake cables connected thereto.
Figures 2, 3:
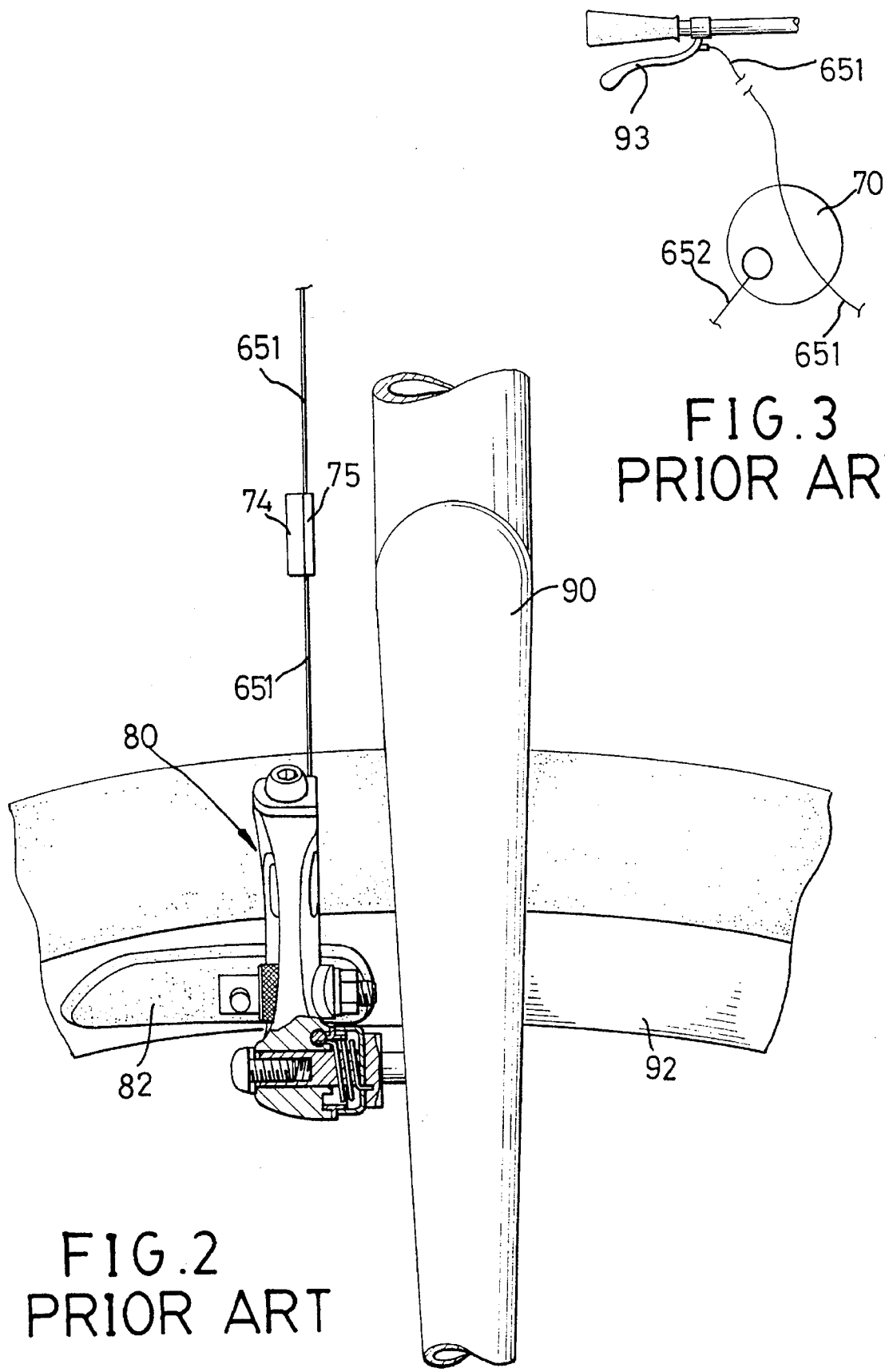
FIG. 2 is a side elevational view, partly in section, of the conventional connector disposed to a brake assembly disposed to a front fork.
FIG. 3 is an illustrative view of the conventional connector and two brake cables disposed thereto.
Figure 4:
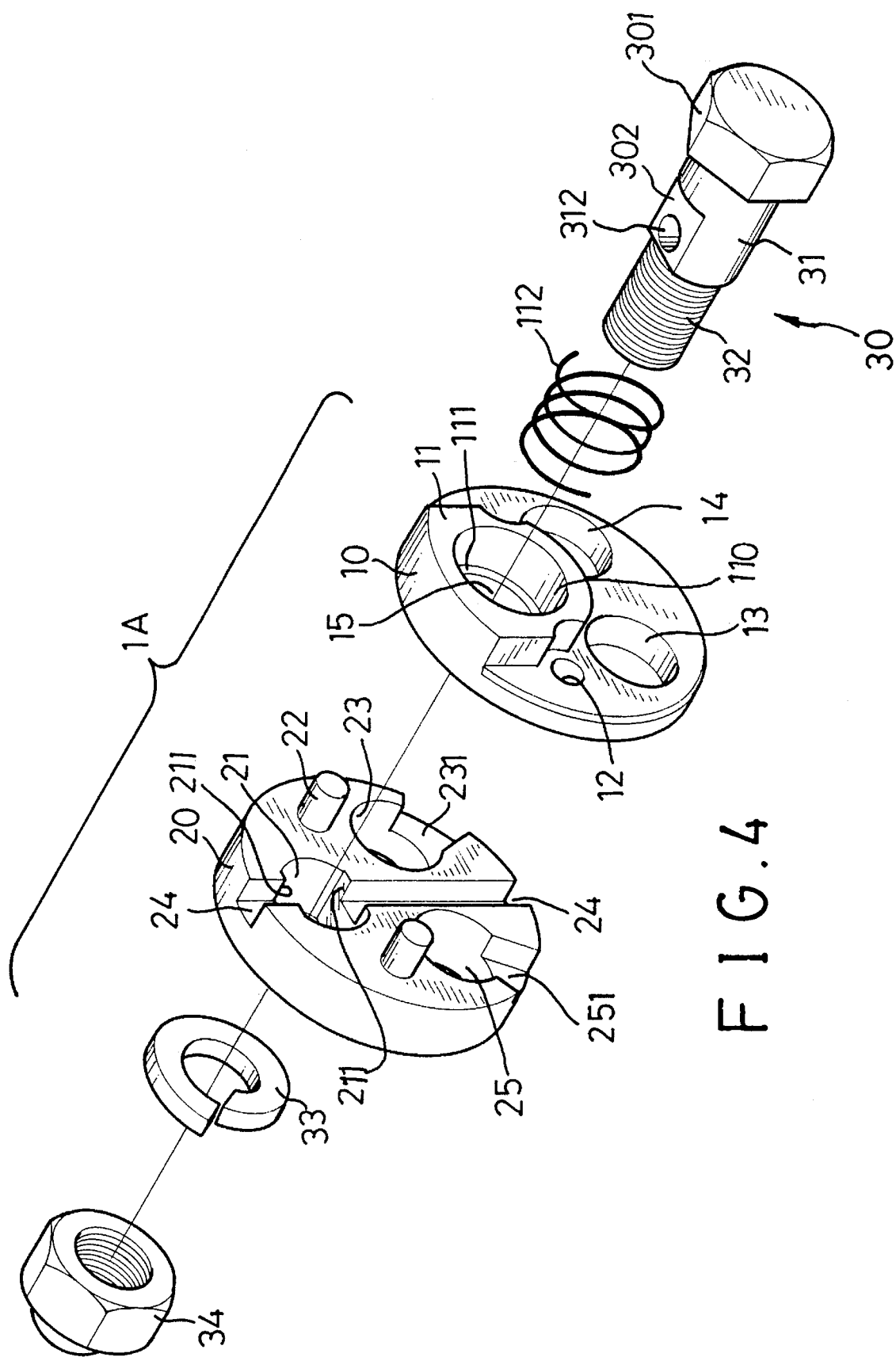
FIG. 4 is an exploded view of a connector and a bolt in accordance with the present invention.
Figure 5:
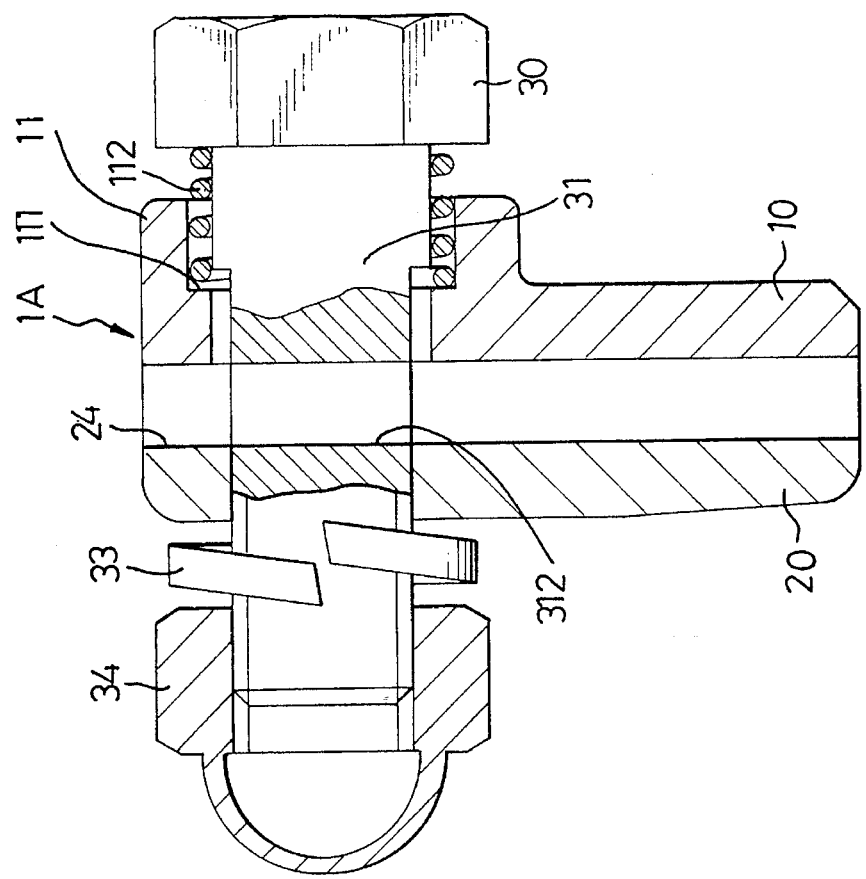
FIG. 5 is a side elevational view, partly in section, of the connector and a bolt in accordance with the present invention.
Figure 6:
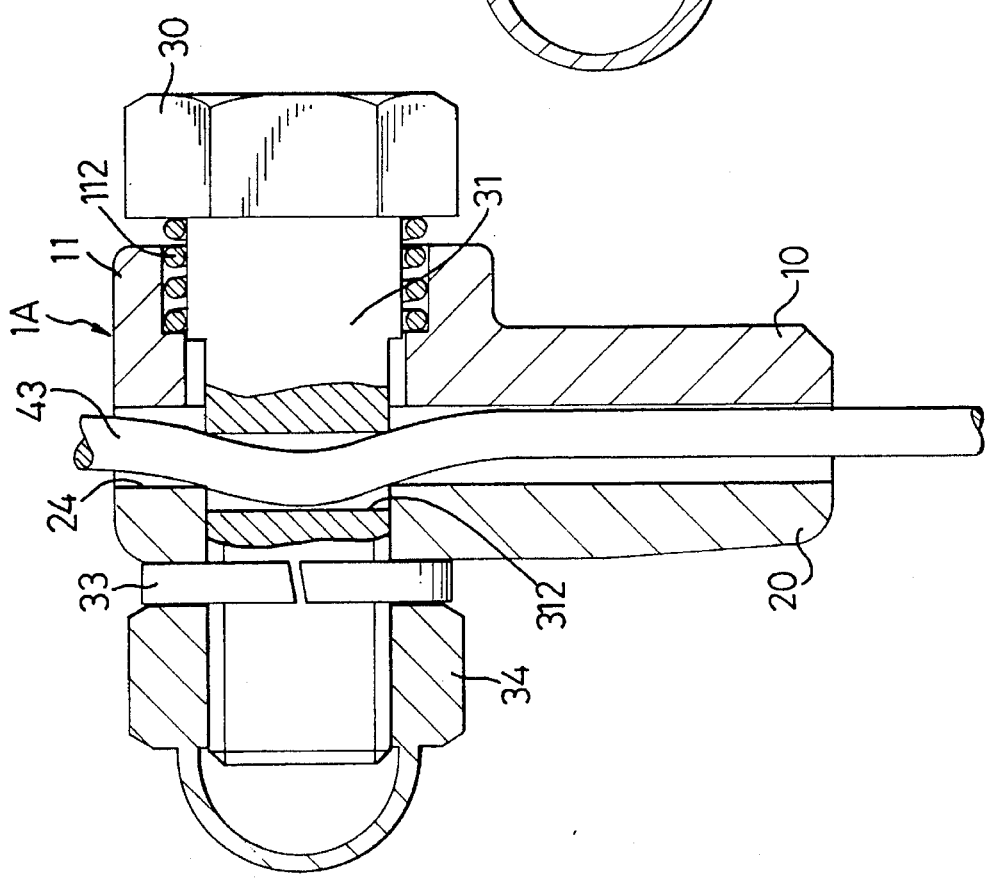
FIG. 6 is a side elevational view, partly in section, of the connector and a bolt through which a third brake cable extends in accordance with the present invention.
Figure 7:
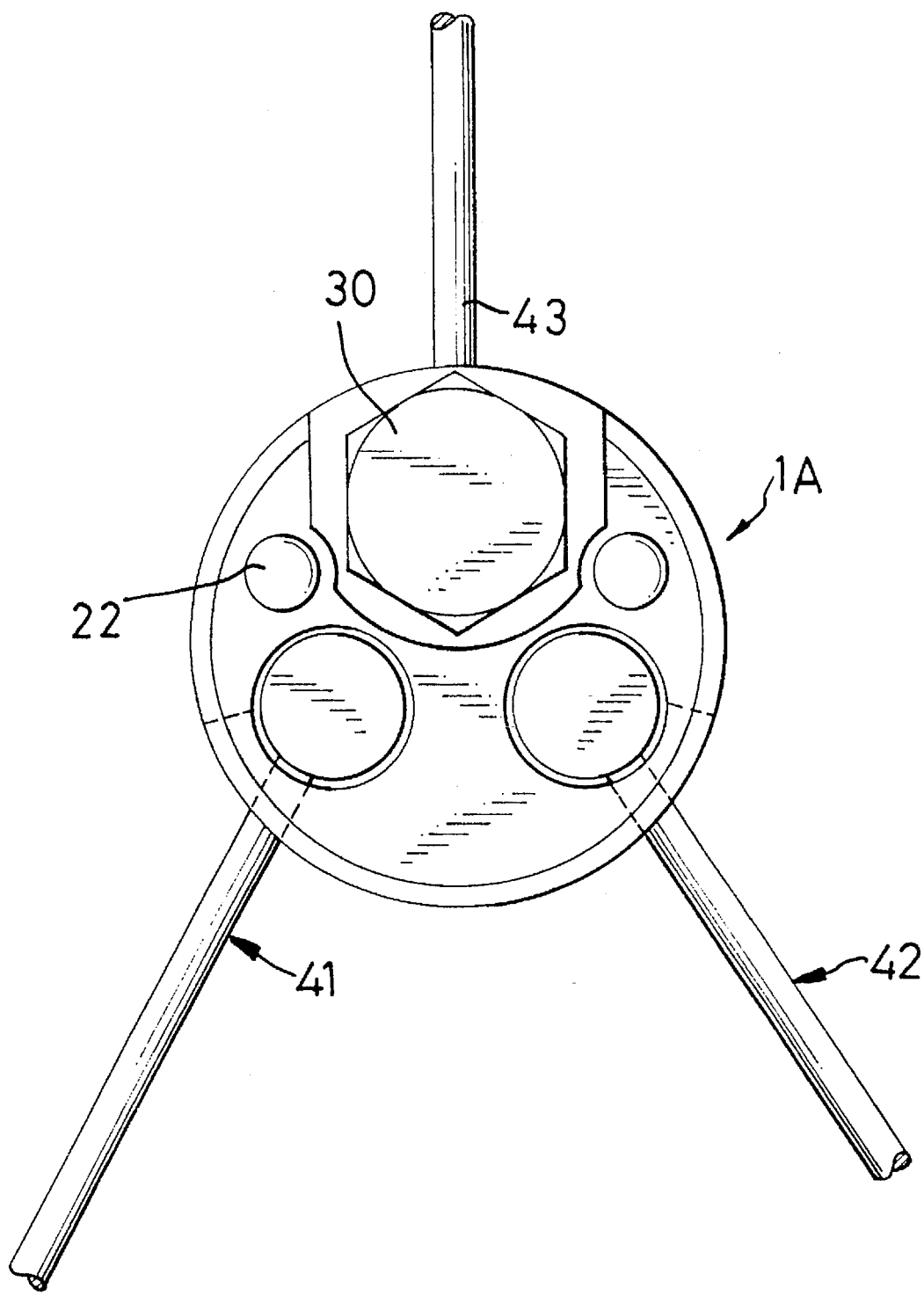
FIG. 7 is an illustrative view of the connector and three brake cables.
Figure 8:
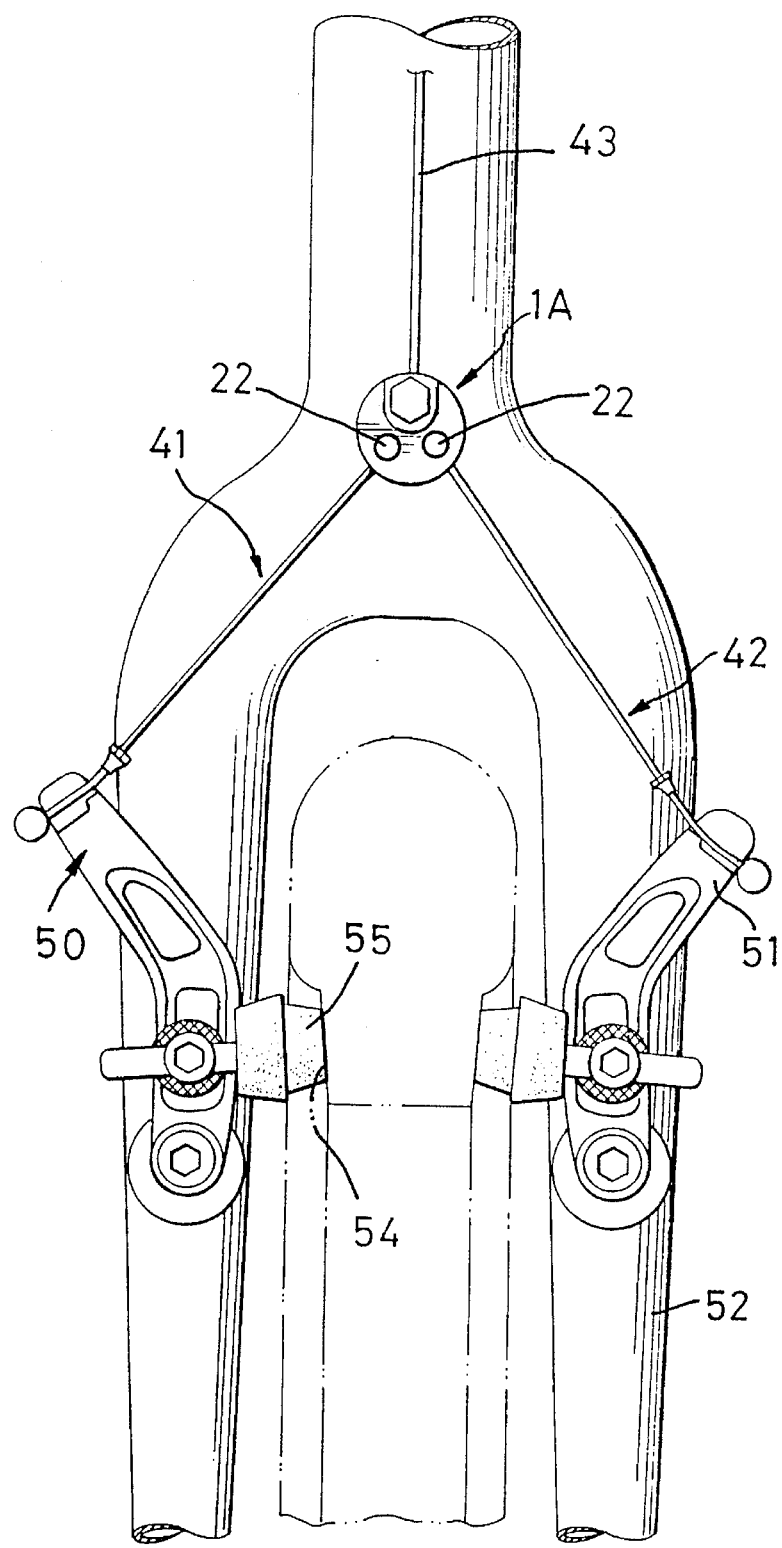
FIG. 8 is a front elevational view of the connector and a brake assembly disposed to a front fork of a bicycle.

Referring to the drawings and initially to FIG. 4, a connector 1A in accordance with the present invention is composed of a first part 10 and a second part 20, the first part 10 having a first side and a second side, a first hole 13 and a second hole 14 defined therein, two passages 12 defined in the first part 10 and each located above a corresponding one of the first hole 13 and the second hole 14, a bore 15 defined in the first part 10 and a tubular portion 11 extending from the first side of the first part 10 and defining a counter-bore 110 communicating with the bore 15, a shoulder 111 formed between a first periphery of the bore 15 and a second periphery defining the counter-bore 110. The bore 15 and the counter-bore 110 are defined above and between the two passages 12, the first hole 13 and the second hole 14.

The second part 20 has a first side and a second side, the first side thereof having a first recess 25 and a second recess 23 defined therein and which correspond to the first hole 13 and the second hole 14 of the first part 10 respectively, two cut-outs 251, 231 defined in a periphery of the second part 20 and respectively communicating with the first recess 25 and the second recess 23. Two protrusions 22 extend from the first side of the second part 20 and respectively correspond to the passages 12 of the first part 10. A third hole 21 is defined in the second part 20 and corresponds to the bore 15 of the first part 10, two flat portions 211 are formed diametrically opposite on the periphery defining the third hole 21 and, a groove 24 is defined transversely in the first side of the second part 20 and in communication with the third hole 21 and is defined between the first recess 25 and the second recess 23. A bolt 30 has a head 301 and a shank 31, the shank 31 having a first portion and a second portion, the first portion having a hole 312 transversely defined therein and the second portion having a threaded portion 32 defined therearound for engagement with a nut 34. Two flats 302 corresponding to the flat portions 211 of the third hole 21 are defined diametrically opposite on a periphery of the first portion of the shank 31.

Referring to FIGS. 5 through 8, when assembling the connector 1A, a first brake cable 41 and a second brake cable 42 are respectively received in the first recess 25 and the second recess 23 with one end thereof, the other end of each of the first brake cable 41 and the second brake cable 42 is connected to a corresponding brake arm 50, 51 which are pivotally engaged to a front fork 52. The first part 10 and the second part 20 are engaged together by extending the two protrusions 22 through the two passages 12 of the first part 10 and the bolt 30 extends through the counter-bore 110, the bore 15 and the third hole 21. A third brake cable 43 is inserted into the groove 24 and extends through the hole 312 of the bolt 30 with one end thereof, the other end of the third brake cable 43 is connected to a brake lever (not shown), the bolt 30 extends through a spring 112 and extends out of the third hole 21 of the second part 20 and further extends through a washer 33 and is engaged to the nut 34 with the threaded portion 32 thereof. The third brake cable 41 is securely engaged in the connector 1A by tightening the bolt 30, best shown in FIG. 6, wherein, the spring 112 is received in the tubular portion 11 and is disposed between the shoulder 111 and the head 301 of the bolt 30.

When a rider grasps the brake lever, the third brake cable 43 is pulled upwardly and thus the first brake cable 41 and the second brake cable 42 are therefore pulled upwardly simultaneously to pivotally rotate the corresponding brake arms 50, 51 to stop a wheel rim 54 by friction occurring between the wheel rim 54 and a brake block 55 disposed to each of the brake arms 50, 51. The first brake cable 41 and the third brake cable 43 have an included angle defined therebetween which is equal to that defined between the second brake cable 42 and the third brake cable 43 such that when the connector 1A is pulled upwardly, an equal force is exerted to each of the first brake cable 41 and the second brake cable 42.

Accordingly, if an adjustment of a position of the brake arms 50, 51 is needed, an operator simply unscrews the bolt 30 and pulls up (or pushes down) the third brake cable 43 to maintain a suitable position of the first and the second brake cables 41, 42.

Although the invention has been explained in relation to its preferred embodiment, it is to be understood that many other possible modifications and variations can be made without departing from the spirit and scope of the invention as hereinafter claimed.

I claim:

1. A connector for engaging brake cables, said connector composed of a first part and a second part, said first part having a first side and a second side, a first hole and a second hole defined therein, two passages defined in said first part and each located above one of said first hole and said second hole, a bore defined in said first part, said first side thereof having a tubular portion extending therefrom and defining a counter-bore in communication with said bore;

said second part having a first side and a second side, said first side having a first recess and a second recess defined therein and which correspond to said first hole and said second hole of said first part respectively, two cut-outs defined in a periphery of said second part and respectively communicating with said first recess and said second recess, two protrusions extending from said first side of said second part and respectively corresponding to said passages, a third hole defined in said second part and corresponding to said bore of said first part and, a groove defined transversely in said first side of said second part and communicating with said third hole and defined between said first recess and said second recess, said two protrusions passing through said two passages of said first part, a first brake cable and a second brake cable respectively received in said first hole, first recess and said second hole, said second recess, and a bolt having a head and a shank, said shank having a first portion and a second portion, said first portion having a hole transversely defined therein for a third brake cable to extend therein and said second portion having a threaded portion formed therearound for engagement with a nut.

2. The connector as claimed in claim 1 wherein a shoulder is formed between a first periphery defining said bore and a second periphery defining said counter-bore, a spring is disposed between said shoulder and said head of said bolt in said tubular portion.

3. The connector as claimed in claim 1 wherein a washer for said bolt extending through the connector is disposed between said second part and said nut.

4. The connector as claimed in claim 1 wherein said first brake cable and said third brake cable have an included angle defined therebetween which is equal to that defined between said second brake cable and said third brake cable.

5. The connector as claimed in claim 1 wherein said third hole has two flat portions formed diametrically opposite on a periphery defining said third hole and said bolt has two flats corresponding to said flat portions.

* * * * *